United States Patent [19]

Schayes et al.

[11] 4,208,677
[45] Jun. 17, 1980

[54] FACSIMILE CIRCUIT

[75] Inventors: Raymond G. G. Schayes; Pol A. G. J. Gustin, both of Brussels, Belgium

[73] Assignee: U.S. Philips Corporation, New York, N.Y.

[21] Appl. No.: 917,974

[22] Filed: Jun. 22, 1978

[30] Foreign Application Priority Data

Jul. 28, 1977 [BE] Belgium .................. 179713

[51] Int. Cl.² .......................... H04N 1/40
[52] U.S. Cl. ............................... 358/280
[58] Field of Search ........... 358/256, 263, 280, 282, 358/283, 284

[56] References Cited

U.S. PATENT DOCUMENTS

| | | | |
|---|---|---|---|
| 2,255,408 | 9/1941 | Carlisle | 358/280 |
| 3,622,698 | 11/1971 | Richeson, Jr. et al. | 358/284 |
| 3,723,649 | 3/1973 | Pitegoff et al. | 358/282 |
| 4,084,196 | 4/1978 | Tisue et al. | 358/280 |

Primary Examiner—Robert L. Griffin
Assistant Examiner—Joseph A. Orsino, Jr.
Attorney, Agent, or Firm—Thomas A. Briody; William J. Streeter; Simon L. Cohen

[57] ABSTRACT

A facsimile circuit for a transmitter or a receiver, having an automatic switch-over between a photo and a text information signal processing. The more or less analog changing, photo information signal and the pulse-shaped changing, text information signal are converted into a binary signal suitable for supply to a reproduction device. A detection circuit, which performs a dual signal differentiation for detecting the presence of photo or text information controls a switch-over device through which the facsimile signal becomes available for transmission and/or reproduction after it has passed through an analog-binary or pulse-binary signal conversion circuit respectively.

7 Claims, 4 Drawing Figures

FACSIMILE CIRCUIT

The invention relates to a facsimile circuit suitable for converting a facsimile signal which changes in a pulse-shaped manner and particularly corresponds to a text or changes more or less in an analog manner and particularly corresponds to a photograph, into a facsimile signal suitable for reproduction.

Such a circuit is described as part of a specific facsimile system in U.S. Pat. No. 3,622,698.

It is described for the system that the transmitter comprises a manually operable selection switch for a specific signal processing circuit, so that other signal processings take place at the recording of printed text resulting in the pulse-shaped facsimile signal then those at a photo reproduction resulting in the more or less analog facsimile signal. At the transmitter the selector switch is adjusted to one of the two positions prior to transmission depending on whether photographic or text information is to be transmitted. The reproduction device which is specific to the facsimile system comprises circuits provided with a threshold setting, a text or saturation setting and a background setting.

The result is that in the facsimile system there are two different transfer characteristics between the facsimile information to be transmitted and the ultimate facsimile picture supplied by a reproduction device; in operation the transfer characteristic has for text transmission an abrupt transition between two signal levels, while for phototransmission it has a continuous, linearly varying transition. For the facsimile picture to be reproduced it holds that the text is reproduced with a sharp contrast between white and black and the photograph with the correct grey levels between white and black.

It is described that it is not only possible to use the specific system with both a modified transmitter and a modified reproduction device but to use alternatively a modified transmitter or reproduction device with an unmodified reproduction device or transmitter respectively. It is stated that the improvement is not optimum then but yet sufficiently favorable.

It appears that in the prior art facsimile system the transmitter must be provided with a manually operable selection switch intended for the transmission of a photograph or a text and that a modified matched reproduction device must be used to obtain an optimum advantage. It furthermore appears that with the transmission of a combined picture having photographic and text information a choice must be made between the use of one or the other transfer characteristic.

It is an object of the invention to realize a facsimile circuit which can be used at the transmitter or at the reproduction device, whatever is desired, without the necessity of mutual matching of transmitting and reproduction device for obtaining an optimum advantage, while also for combined pictures having text and photographic information the two informations are each processed in an optimum manner. To this end the facsimile circuit according to the invention is characterized in that the facsimile circuit comprises a detection circuit for detecting the presence at a circuit input of a facsimile signal which changes in pulse-shaped or a more or less analog manner, a switching signal generator connected to the output of the detection circuit, a switch-over device connected to the output of the switching signal generator and provided with a first and a second selection contact and a master contact, the first selection contact being connected via a pulse-binary signal conversion circuit and the second selection-contact via an analog-binary signal conversion circuit to the circuit input or output respectively, the master contact being connected to the circuit output or input respectively.

The facsimile circuit can be used at the transmitter as well as at the receiver. Using it at the transmitter ensures that the binary signal supplied by the facsimile circuit is suitable for transmission over transmission paths intended for binary signal transmission. Using it at the receiver ensures that the received, pulse-shaped and analogously changing facsimile signal is made suitable for reproduction by means of a reproduction device operating in a binary manner. Such a binary reproduction device comprises a black-dot printer which reproduces a black picture by closely printed dots and a more or less grey picture by black dots which are printed, for example, farther or less far apart. Grey reproductions can alternatively be obtained by varying the dimensions of the black dots or spots respectively instead of varying the dot spacings.

A facsimile circuit having a simple implementation of a detection circuit is characterized in that the detection circuit comprises a series arrangement of a signal differentiating circuit and a threshold circuit.

An improved detection is obtained with a facsimile circuit which is characterized in that the signal differentiating circuit is implemented as a dual differentiator.

An optimum detection is obtained with a facsimile circuit which is characterized in that the signal differentiating circuit comprises two delay devices in series and a signal combining circuit provided with three inputs for connecting to the inputs or outputs respectively, of the two delay devices.

A further implementation of a detection circuit is characterized in that the signal differentiating circuit is connected to the threshold circuit via a full-wave rectifier circuit.

A facsimile circuit advantageously suitable for use with a facsimile signal generated by discrete pick-up elements wherein information in surface areas which are smaller than the surface area of the pick-up element cannot be detected properly without additional measures, is characterized in that the pulse-binary signal conversion circuit comprises a threshold circuit provided with an input for the supply of the facsimile signal to be converted and which is in addition connectable to the output of the signal differentiating circuit.

To prevent a repeated switch-over from occurring in the case of closely spaced characters and figures in the text and the circuit from being active in the photo mode while passing through short distances, a facsimile circuit according to the invention is characterized in that the switching signal generator has a delay time for switching over, with the delay time at the switch-over device after analog signal detection, from the first selection contact connected to the pulse-binary signal conversion circuit, to the second selection contact connected to the analog-binary signal conversion circuit.

In order to obtain characters and figures in a text with sharp edges and emphasized sharp contours in a photograph a facsimile circuit is furthermore characterized in that the pulse- and analog-binary signal conversion circuits each comprise a delay device having a delay time of approximately half the delay time present in the switching signal generator.

The invention will be further described by way of non-limitative example with reference to the following figures, wherein.

Figure 1:
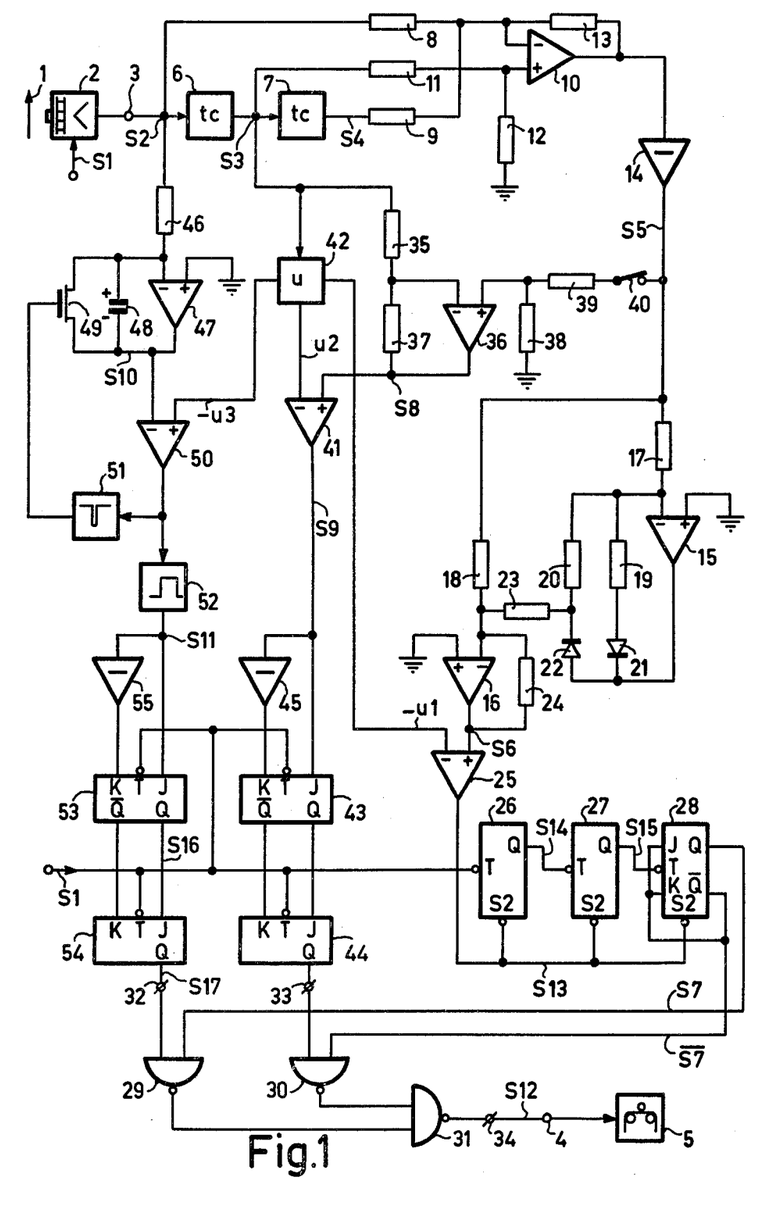
FIG. 1 shows a circuit diagram of a facsimile circuit according to the invention.

In FIG. 1 reference numeral 1 denotes an optical pattern which is recorded by a facsimile recording device 2 and converted under the control of a clock pulse signal S1 into a facsimile signal S2. The output of the recording device 2 is connected to a circuit input 3 of a facsimile circuit according to the invention, comprising a circuit output 4 which carries a signal S12 and is connected to a reproduction device 5. The facsimile circuit (3,4) may either be provided near the recording device 2, that is to say the circuit (3,4) is part of a transmitter (2, 3, 4), or near the reproducing device 5, which results in a receiver (3, 4, 5). Herein the transmission path extends between the output 4 and the reproducing device 5 or between the recording device 2 and the input 3.

Figure 2:
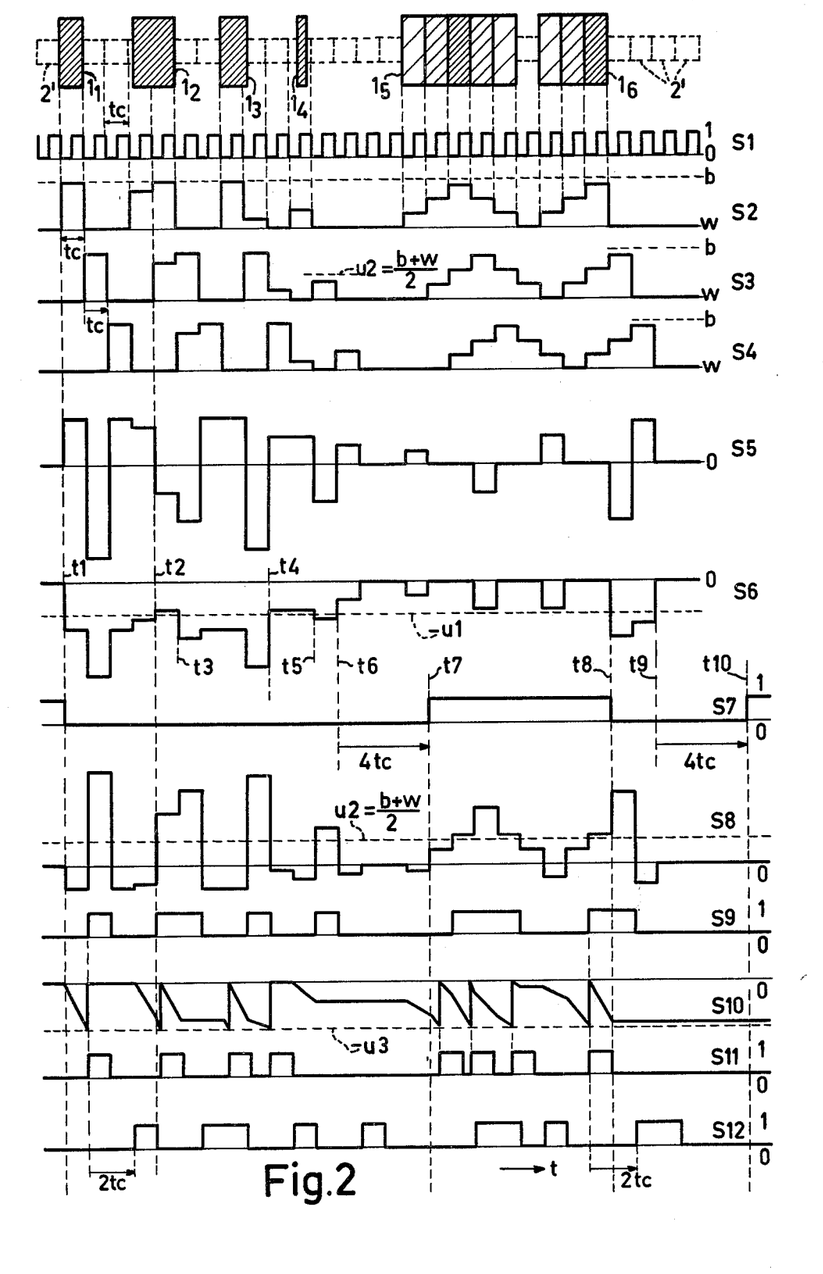
FIG. 2 shows signal curves associated with an information to be recorded and processed, as a function of the time.

FIG. 2 shows the pattern 1 in greater detail. Reference numerals $1_1$, $1_2$, $1_3$ and $1_4$ denote, as information portions, black lines against a bright background which, for example, are part of characters, not further shown, such as letters and figures, in, for example, a text on a page. Reference numerals $1_5$ and $1_6$ denote information portions having a grey scale to substantially black, as, for example, occurring in a photograph. In addition, reference numeral 2' denotes pick-up elements present in the recording device 2 and by means of which the optical pattern 1 is recorded and converted into electric signals. In relation to the pick-up elements 2' the clock pulse signal S1, having clock pulses occurring between a logic 0 and 1 and the facsimile signal S2 supplied under the control thereof by the recording device 2 of FIG. 1, are plotted in FIG. 2 as a function of the time t. It is assumed that the logic 0 and additional signal levels, to be indictated by a 0, correspond to the ground potential. Reference t1 to t10 inclusive in FIG. 2 denote some instants. Reference tc in FIG. 2 denotes the clock pulse period within which the information stored in one of the pick-up elements 2' is available for further processing. The facsimile signal S2 of FIG. 2 is given by way of example with a variation between the, for example, bright background having a white level w (for example corresponding to the ground potential) and a black level b. For the text-information portions $1_1$, $1_2$, $1_3$ and $1_4$ the signal S2 has a pulse-shaped character, while the photo-information portions $1_5$ and $1_6$ result in a more or less analog change. For simplicity of the signal curves shown in FIG. 2 a few signal levels are shown only. In practice the photographic information will furnish a signal S2 which changes analogously or continously more than shown in the drawing.

Instead of using only one row of discrete pick-up elements 2' in the recording device 2, along the front of which the information 1 passes, a normal television pick-up device might be used having, for example, a panel provided with rows of pick-up elements or with a television pick-up tube. In the latter case the (video) signal S2 would have an entirely analog chracter. As the reproduction device 5 is no normal television display device but a facsimile reproductinn device operating preferably on a binary basis, such as a printing apparatus, the then fully analog (video) signal S2 should be converted into a binary signal prior or after transmission to the reproducing device 5. The analog-to-binary conversion will mainly occur depending on the properties of the transmission path, prior or after the transmission. It is assumed that when the recording device 2 is provided with a television pick-up tube supplying an analog signal, this signal is converted via a signal sample-and-hold circuit, controlled by clock pulse signal S1 into, for example, the signal S2 shown in FIG. 2. For the reproducing device 5 which operates on a binary basis it holds that it furnishes, a binary signal (such as the signal S12 of FIG. 2) being applied, a printed text or photograph, the black-white text being obtained in known manner by printing a maximum number of picture elements per mm and the photo-grey scale being obtained by varying the printed number of picture elements per mm, and/or the size of the picture elements. The detailed construction of the reproducing device 5, operating in the binary mode, is irrelevant to the invention; it is relevant that the pulse-shaped (text) and analog (photograph) changing signal S2 must be converted in an optimum manner into a binary signal S12 for supply to the reproducing device 5, which operates in the binary mode and is implemented for supplying a reproduction having black-white transitions and a grey scale.

For detecting whether the pulse-shaped or analog signal portion in the signal S2 is present at the switching input 3 this input is connected to a series arrangement of two signal delay devices 6 and 7, having a delay time equal to the clock pulse period tc. The outputs of the devices 6 and 7 carry signals S3 and S4 shown in FIG. 2. The signals S2 and S4 are applied via respective resistors 8 and 9 to the inverting input of a differential amplifier 10 to whose non-inverting input the signal S3 is applied via resistor 11. The non-inverting or the inverting input, respectively, of the amplifier 10 is connected via a resistor 12 or 13, respectively, to ground or the amplifier output, respectively. The output of the amplifier 10 is connected to an inverting amplifier 14 whose output carries a signal S5. FIG. 2 shows the signal S5 as a signal combination relative to the ground potential 0 of the signals S2, S3 and S4 for which it holds that S5=S2+S4−2S3. A signal combining circuit (8–14) thus formed is provided with resistors 8, 9, 11 and 13 of the same value and a resistor 12 of double the value.

Relative to the signal S3 the signal S5=(S4−S3)−(S3−S2) furnishes the second signal derivative, so that FIG. 1 shows a signal differentiating circuit (6–14) implemented as a dual signal differentiator. Instead of the implementation shown, a dual signal differentiation with two consecutive capacitor-resistor circuits might be used with equal advantage. The implementation shown in FIG. 1 has the advantage that, relative to the signal S3, the result of the signal differentiation can be obtained more rapidly than with the implementation with the capacitor-resistor circuits wherein a delay occurs depending on the resistor-capacitor charging time constants.

For the detection of the pulse-shaped or analog signal portion in the signal S2 the first signal derivative (S3-S2) might be used instead of the second signal derivative. Using the second signal derivative has the advantage that information is obtained from both before and ater a given picture element. Herewith a linearly changing signal has a second signal derivative equal to zero, while the first signal derivative furnishes a signal having a constant value differing from zero, so that a faulty detection may occur at an earlier instant.

For performing the pulse-shaped or analog signal detection the signal S5 is applied to a full-wave rectifier circuit comprising two differential amplifiers 15 and 16. Via a resistor 17 or 18 the signal S5 is applied to the inverting input of the differential amplifier 15 or 16, whose non-inverting input is connected to ground. The output of the amplifier 15 has a feedback circuit to the inverting input, having two series arrangements of each a resistor 19 or 20 and a diode 21 or 22, disposed with opposite pass directions. The junction of the resistor 20 and the cathode of diode 22 is connected via a resistor 23 to the inverting input of amplifier 16, which is furthermore, connected to the amplifier output via a resistor 24. A full-wave rectifier circuit (15–24) is thus formed, a signal S6 as shown in FIG. 2 occurring at the output of the amplifier 16.

The full-wave rectifier circuit (15–24) operates as follows. A positive voltage in the signal S5 gives a negative voltage at the output of the amplifier 15, so that diode 21 can conduct and diode 32 is cutoff. As the inverting input of the amplifier 15 or 16, fed back via resistor 19 or 24, carries substantially the ground potential (because the non-inverting input is connected to ground) the positive signal S5 supplies, via a resistor circuit (17, 18, 24) and inverting amplifier 16 the negative signal S6 at the output thereof. This resistor circuit (17, 18, 24) and the amplifier 16 are, for example, rated such that the positive voltage in the signal S5 gives an equally large, but negative, voltage in the signal S6 as shown in FIG. 2.

A negative voltage in the signal S5 results in a positive voltage at the output of amplifier 15 so that diode 22 can conduct and diode 21 is cutoff. The positive voltage at the junction of the resistors 20 and 23 is present with a resistor circuit (20, 23, 28, 17, 24) comprising resistor 20 being connected to substantially the ground potential, the resistor 23 and 18 being in series connected to the negative voltage (signal S5) at the output of amplifier 14, the resistor 17 being connected to ground and, in addition, resistor 24 to the output of amplifier 16. The positive voltage obtained at the junction of the resistors 20 and 23 and the gain by means of the fed back amplifier 16 are, for example, thus that the obtained negative voltage in the signal S6 is equally large as that in signal S5, as shown in FIG. 2.

The signal S6 originating from full-wave rectifier circuit (15–24) is ultimately applied for detection to the non-inverting input of a differential amplifier 25, to whose inverting input a negative threshold voltage $-u1$ is applied. The amplifier 25 operates as a threshold circuit (25), a positive voltage or a negative voltage (or the ground potential) occurring at the output if the voltage in the signal S6 is less or more negative, respectively, than the voltage $-u1$. In FIG. 2 the voltage $-u1$ is plotted versus the drawn signal S6. It appears that signal differentiating circuit (6–14), which supplies the signal S5, the full-wave rectifying circuit (15–24) supplying the signal S6 and the threshold circuit (25) act as a detection circuit (6–25) for detecting the presence at the circuit input 3 of a pulse-shaped or a more or less analog changing signal portion in the signal S2.

Instead of using the full-wave rectifying circuit (15–24) and the single threshold circuit (26), a threshold circuit having a positive and a negative threshold voltage might be used to which the signal S5 is applied directly. Compared to the more complicated threshold circuit then required, the use of full-wave rectification and a single threshold is considered to be more advantageous.

The output of amplifier 25 is connected to reset inputs S2 of three flipflops 26, 27 and 28 of the JK-type. The JK-flipflops comprise a trigger input T, condition inputs J and K, a first output Q and a second output $\overline{Q}$ with an inverse signal, a reset input S2 and a setting input S1, not shown in FIG. 1. By means of circles at the inputs T and S2 is indicated that the flipflops 26, 27 and 28 react to a low signal level after falling following trailing signal edges. In general it holds that a low level (logic 0) at the reset input S2 overrides and furnishes independent of the signal supply to the T, J or K-input a low level at the Q-output. In addition, non-interconnected J- and K-inputs carry, owing to internal couplings, a high level (logic 1), the flipflop changing state each time after a trailing signal edge at the T-input. A logic 0 present at both the J and K-input ensures that, independent of whether it is in one or the other state, the flipflop cannot be affected via the T-input.

The flipflops 26, 27 and 28 together constitute a switching signal generator (26, 27, 28) provided with a delay time in a manner, described hereinafter. The clock pulse signal S1 is applied to the T-input of the flipflop 26 and the Q-output of the respective flipflop 26 or 27 is connected to the T-input of the respective flipflop 27 or 28. The $\overline{Q}$-output of the flipflop 28 is connected to the J and K-input of the flipflop 28. The Q-output of the flipflop 28 carries a switching signal S7 shown in FIG. 2, the $\overline{Q}$-output carrying the inverse switching signal $\overline{S7}$, not shown.

Figure 3:
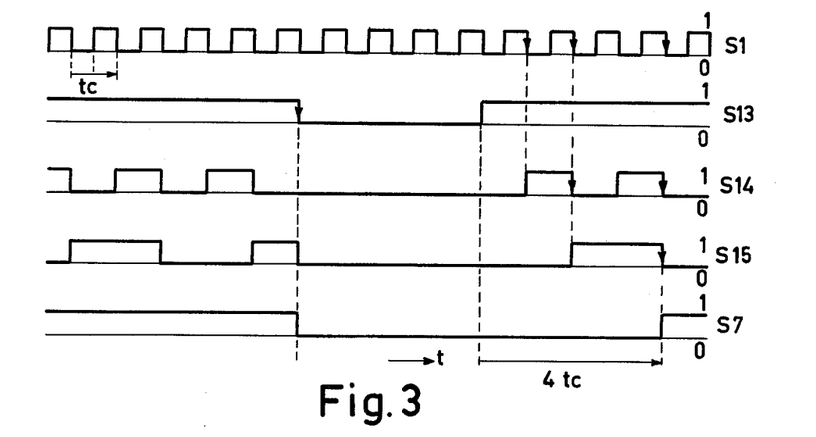
FIG. 3 and FIG. 4 show for explaining the operation of the circuit diagram of FIG. 1 some further signal curves as a function of the time.

For explaining the operation of the switching signal generator (26, 27, 28) FIG. 3 shows some additional signals S13, S14 and S15 as a function of the time t, having transitions between the logic 1 and 0. The signal supplied by the threshold circuit (25) at the S2-inputs is denoted by S13. The occurrence of the logic 0 in the signal S13 after detection of text information results in an overriding manner in that the Q-outputs of the flipflops 26, 27 and 28 must all carry the logic 0, which means a change of stage for the flipflops 27 and 28 which have the respective signals S15 and S7 at their Q-outputs. The logic 0 in signal S13 occurs if, in the signal S6 of FIG. 2, the threshold voltage $-u1$ is passed in the negative direction. The subsequent passing of the threshold voltage $-u1$ into the positive direction results in the logic 1 occurring in the signal S13. The flipflop 26 changes state at the next following trailing edge in the clock pulse signal S1 and the logic 1 occurs in the signal S14. At the subsequent trailing edge in the clock pulse signal S1 a trailing edge occurs in the signal S14, which results in a rising edge in the signal S15. Two clock pulse periods later a trailing edge occurs in the signals S14 and S15, the latter signal with the logic 0 causing the flipflop 28 to change state, the logic 1 in the signal S7 occurring at the Q-output. The logic 0 in the signal $\overline{S7}$ at the $\overline{Q}$-output connected to the J and K-iinput causes the flipflop 28 to remain in the occupied, stable state independent of the signal S15 at the T-input until a next trailing edge occurs in the signal S13. It appears that a trailing edge occurs in the switching signal S7 immediately when this edge occurs in the signal S13, while the rising edge occurs with a delay of 4tc after than in the signal S13. In FIG. 2 the delay times of 4tc after instants t6 and t9 to the respective instants t7 and t10 are likewise indicated at the signal S7. From the signals S6 and S7 it appears that passing the threshold voltage −u1 in the negative direction at the instants t1 and t8 becomes immediately apparent in the switching signal S7, while passing it into the positive direction remains without result until after four clock pulse periods tc, this result not occurring at brief passages of one or two clock pulse periods tc between the instants t2 and t3 or t4 and t5 respectively, which is also not desirable. For, briefly exceeding the threshold voltage is inherent to the pulse-shaped signal corresponding to the text, so that they must not affect the (text) switching signal S7.

The switching signal S7 and its inverse $\overline{S7}$ are applied for switching purposes to an input of a NAND-gate 29 or 30. The outputs of the gates 29 and 30 are connected to inputs of a NAND-gate 31. The gates 29, 30 and 31 constitute a switch-over device comprising two selection contacts 32 and 33 connected to an input of the gates 29 and 30 respectively and a master contact 34 connected to the output of the gate 31. The master contact 34 of the switch-over device (29,34) is connected to the circuit output 4. It follows that at a logic 1 in the signal S7 occurring when a photographic information portion $1_5$, $1_6$ is present in the information 1, the selection contact 32 is connected to the master contact 34, while with the logic 0 in the signal S7 and, consequently, the logic 1 in the signal $\overline{S7}$ (text information) the selection contact 33 is connected to the master contact 34. A circuit, to be described hereafter, for a pulse-binary signal conversion or an analog-binary signal conversion is connected to the selection contact 33 or 32.

The junction of the delay devices 6 and 7 is connected via a resistor 35 to an inverting input of a differential amplifier 36, which is connected to the amplifier output via a resistor 37. The non-inverting input of the amplifier 36 is connected to ground via a resistor 38 and, via a resistor 39 and a selector switch 40, to the output of the inverting amplifier 14 provided in the signal differentiating circuit (6–14). The output of the amplifier 36 carrying a signal S8 shown in FIG. 2, is connected to a non-inverting input of a differential amplifier 41, to whose inverting input a threshold voltage u2 is applied. The amplifier 41 operates as a threshold circuit (41), the output carrying a signal S9, shown in FIG. 2.

The signal S8 is formed by means of the resistors 35, 37, 38 and 39 and the amplifier 36 in accordance with the equation $S8 = S3 - k(S2 + S4 - 2S3)$, the signal S8 of FIG. 2 being shown for $k = 0,5$, which results in: $S8 = 2S3 - 0.5(S2 + S4)$. FIG. 2 shows the threshold voltage u2 in accordance with the equation $u2 = (b+w)/2$, the threshold voltage u2, the threshold voltage −u1, described for the signal S6, and a threshold voltage −u3, still to be described with a signal S10, being supplied by a circuit 42 connected to the junction of the delay devices 6 and 7.

With an open switch 40 and using the threshold voltage $u2 = (b+w)/2$, the signal S3 is only utilized for application to the threshold circuit (41). The result would be that the amplitude of the (delayed) pulse in the signal S3, which corresponds to the text information $1_4$, does not pass the threshold voltage u2, so that no pulse would occur in the signal S9. By forming the signal $S8 = 2S3 - 0.5(S2 + S4)$ and by applying this signal to the threshold circuit (41) it is achieved that also narrow text information portions contribute towards the signal S9.

The output of the amplifier 41 is connected to the J-input of a flipflop 43 which is connected by means of its Q- or $\overline{Q}$-output to the J or K-input respectively of a flipflop 44, its Q-output being connected to the selector contact 33. The output of the amplifier 41 is connected via an inverting amplifier 45 to the K-input of the flipflop 43. The T-inputs of the flipflops 43 and 44 are interconnected and are supplied with the clock pulse signal S1. A pulse-binary signal conversion circuit (35–41, 43, 44, 45), which comprises in a manner still to be described a delay device (43, 44, 45), is disposed between the junction of the delay devices 6 and 7 and the selector contact 33 of the switch-over device (29–34).

The circuit input 3 is connected via a resistor 46 to the inverting input of a differential amplifier 47 whose non-inverting input is connected to ground. The output of the amplifier 47 is connected via a capacitor 48 to the inverting input and the source-drain circuit of a transistor 49 provided with an insulated gate electrode is disposed in shunt to the capacitor 48. Furthermore, the output of amplifier 47 is connected to the non-inverting input of a differential amplifier 50 which is connected by means of the non-inverting input to an output, carrying the threshold voltage −u3, of the circuit 42. The amplifier 50 operates as a threshold circuit (50) and the output thereof is connected via a mono-stable multivibrator circuit 51 to the gate electrode of the transistor 49 and, furthermore, to the input of a further mono-stable multivibrator circuit 52.

FIG. 2 shows the signal S10 as it occurs at the output of a signal integrating amplifier circuit (46–49). In FIG. 2 the signal S10 is shown in relation to the signal S2. It follows that, when the signal S10 attains the threshold voltage −u3 a voltage transient is produced at the output of the threshold circuit (50), which transient excites both circuit 51 and 52, causing capacitor 48 to be discharged via transistor 49 and the circuit 52 to supply a signal S11 shown in FIG. 2. In the drawing the signal S11 has pulses of a duration equal to the clock pulse period tc, which, however, is not a requirement.

The output of the circuit 52 carrying the signal S11 is connected to the J-input of a flipflop 53 which is connected by means of the Q or $\overline{Q}$-output to the J or K-input of a flipflop 54, its Q-output being connected to the selector contact 32. The output of the circuit 52 is furthermore connected via an inverting amplifier 55 to the K-input of the flip-flop 53. The T-inputs of the flipflops 53 and 54 are interconnected and supplied with the clock pulse signal S1. Disposed between the circuit input 3 and the selection terminal 32 of the switch-over device (29–34) there is an analog-to-binary signal conversion circuit (46–54) provided with a delay device (53, 54, 55) having a pulse synchronisation as its second task.

Figure 4:
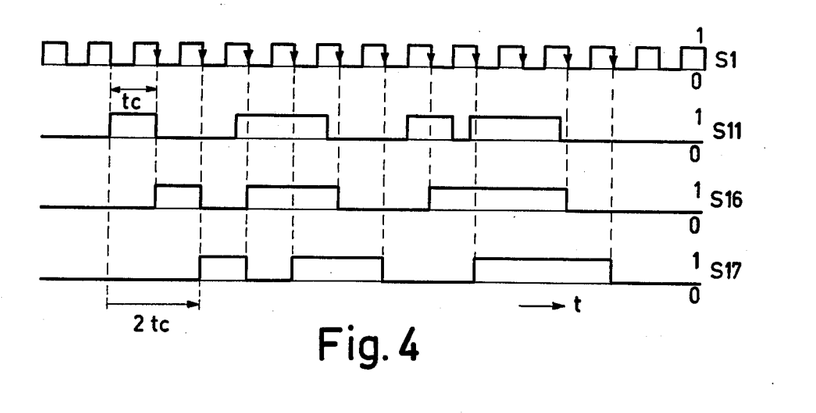

FIG. 4 shows signals S1, S11, S16 and S17 as a function of the time t. In the drawing signal S11 is shown with pulses which can start any moment and have a duration of once or a few times the clock pulse period tc. A duration of two or more clock pulse periods occurs in the case where for some consecutive clock pulse periods the threshold voltage −u3 is each time attained by the signal S10 of FIG. 2. The starting point is a stable state of the flipflops 53 and 54 having at the J and K-inputs, respectively, a logic 0 and 1, respectively, a logic 0 (logic 1) prevailing at the Q-output ($\overline{Q}$-output). The occurrence of the logic 1 in the signal S11 causes the logic 0 to change the state of flipflop 53 after the next following falling edge in the clock pulse signal S1, so that the logic 1 occurs in the signal S16, this logic 1 occurring in the signal S17 after the next falling edge in the signal S1, owing to the fact flipflop 54 changes state. FIG. 4 shows the period 2tc, being the delay time obtained by means of the flipflops 53 and 54. The same applies to the operation of the flipflops 43 and 44 which introduce a delay time 2tc for the pulses in the signal S9.

The flipflops 53 and 54 are not only used for giving the delay but have the pulse synchronization for their second task. A comparison of the signal S11 to the signal S17 of FIG. 4 shows that the randomly occurring pulse edge instants in the signal S11 are prolonged to the instants at which the falling clock pulse edges occur in the signal S1. This results in the occurrence of the binary signal S17 which is in synchronism with the clock pulse signal S1.

It follows from signal S7 of FIG. 2 and the implementation of the switch-over device (29-34) of FIG. 1 that between the respective instants t1 and t7 and t8 and t10 the gate 30 passes the signal S9, delayed two clock pulse periods tc, which also occurs in the signal S12 after gate 31. Between the instants t7 and t8 and gate 29 conducts and the delayed and synchronized signal S11 (to be compared to the signal S17 of FIG. 4) becomes available via gate 34 in the signal S12. The same applies respectively prior to or after the shown instant t1 and t10 respectively.

The time delay 2tc produced by the delay devices (43, 44, 45) and (53, 54, 55) results in that the switch-over to the text information processing is done first and that thereafter the delayed text information becomes available. By choosing the time delay (2tc) to be equal to half the time delay of 4tc caused by the switching signal generator (26, 27, 28) it is achieved that the switch-over action takes place symmetrically at the beginning and the end of the text information processing, before and after or to the left and to the right relative to the character or the figure in the text. If a time delay of 2tc or 6tc is used for the switching signal generator (26, 27, 28), the delay devices (43, 44, 45) and (53, 54, 55) can have a time delay of 1tc or 3tc. In practice choosing a delay time of 4tc appears to be satisfactory for the normally used spacing between the characters and figures in texts.

The reason of this desire to switch between the text and the photograph information processing can easily be explained with reference to the signals S8, S9, S10 and S11 of FIG. 2.

Forming the signal S9 utilized for the production of the text information portions $1_1$, $1_2$, $1_3$ and $1_4$ can be done by means of simply exceeding the threshold (threshold u2 for the signal S8). For forming the signal S11 utilized for reproduction the photograph information portion $1_5$ a signal integration must be effected before a threshold will be exceeded (signal S10 and threshold u3). The shades of grey are added by means of signal integration. Not using signal integration results in that on printing it is not possible to obtain a grey gradation (by varying the picture element spacing or picture element size) and in that the dark grey and black photograph information portions are printed black and light-grey photograph information portions disappear. However, no signal integration must take place when processing text information to avoid that signal variations which do not result in a direct exceeding of the threshold would cause exceeding of the threshold after the signal integration. The result would be that black dots would be printed randomly between the characters and figures, causing a deterioration in the quality of the print. In addition, the signal integration would cause the edges of the characters and figures to be of a frayed nature, whilst sharp edges are obtained when the threshold is exceeded directly.

From the signals shown in FIG. 2 it appears that the photograph information portion $1_6$ does not occur in the signal S12 after a photograph information processing (via the signals S10 and S11), but after a test information processing via the signals S8 and S9. For, the signal S9 delayed for two clock pulse periods tc is passed onto the output 4 via switch-over device (29-34) between the instants t8 and t10. This is caused by the large jump in contrast from substantially black to white in the photograph information portion $1_6$ which causes, in the signal S6, the threshold −u1 to be exceeded and switching signal S7 to switch at the instant t8. The effect obtained is advantageous as now the large jump in contrast, corresponding to a contour, in the photograph can be processed as a text information and is, consequently, emphasized and shown sharp, without fraying, on reproduction.

In the circuit shown in FIG. 1 the switch-over device (29-34) follows after the pulse-binary and the analog-binary signal conversion respectively (35-41, 43, 44, 45) and (46-55) respectively and comprises two inputs (selection contacts 32, 33) and an output (master contact 34). A different arrangement is possible having a switch-over device provided with an input by way of master contact and two outputs by way of selection contacts coupled respectively to the circuit input 3 and the circuit output 4.

In practice the above-described photo or text detection by means of the second signal derivative appears to be effected in the proper manner in a facsimile system in which 3 to 4 elements per mm are utilized for information processing. In the case of more details, for example with an information processing with 8 elements per mm, it appears to be advantageous for the detection to utilize, for example, the average values of consecutive groups of 3 elements instead of the information of each of the elements separately.

What is claimed is:

1. A facsimile circuit suitable for converting a facsimile signal which changes in a pulse-shaped manner and particularly corresponds to a text or changes gradually and particularly corresponds to a photograph, into a facsimile signal suitable for reproduction, the facsimile circuit comprising a detection circuit means for detecting at a detection circuit input the presence of a facsimile signal which changes in a pulse-shaped or a gradual manner, the detection circuit means comprising a signal differentiating circuit means comprising means for comparing a first portion of said facsimile signal with a portion of said facsimile signal that is delayed with respect to said first portion, and a threshold circuit means connected in series with the comparaing means for providing threshold signals in response to an output from the signal differentiating means that exceeds a predetermined value, a switching signal generator connected to an output of the detection circuit and receiving said threshold signals, a switch-over devive connected to an output of the switching signal generator and provided with a first and a second selection contact and a master contact, a pulse-binary signal conversion circuit connected to the first selection contact, an analog-binary signal conversion circuit connected to the second selection contact, said switch-over device selectively connecting either of the first and second selection contacts to the master contact in response to output signals from the switching signal generator, the master contact being connected to an output of the facsimile circuit.

2. A facsimile circuit as claimed in claim 1, characterized in that the signal differentiating circuit means is implemented as a dual signal differentiator.

3. A facsimile circuit as claimed in claim 2, characterized in that the signal differentiating circuit comprises two delay devices in series and a signal combining circuit provided with three inputs for connection to the outputs respectively of the two delay devices and to an input of the signal differentiating circuit.

4. A facsimile circuit as claimed in claim 1 2 or 3, characterized in that the signal differentiating circuit means is connected to the threshold circuit via a full-wave rectifier circuit.

5. A facsimile circuit as claimed in any of the claims 1, 2 or 3 inclusive, characterized in that the pulse-binary signal conversion circuit comprises a threshold circuit provided with an input for the supply of the facsimile signal to be converted and provided with a further input selectively connected to the output of the signal differentiating circuit.

6. A facsimile circuit as claimed in any of claims 1, 2 or 3, characterized in that the switching signal generator provides the switch-over device, in response to the detection of a gradually changing facsimile signal, with output signals having a delay following detection that exceeds the delay between the detection of a pulse shaped facsimile signal and an output signal from the switching signal generator.

7. A facsimile circuit as claimed in claim 6, characterized in that the pulse- and analog-binary signal conversion circuits each comprise a delay device having a delay time of approximately half the delay time present in the switching signal generator.

* * * * *

UNITED STATES PATENT AND TRADEMARK OFFICE
CERTIFICATE OF CORRECTION

PATENT NO. : 4,208,677
DATED : June 17, 1980
INVENTOR(S) : Raymond G.G. Schayes Et Al It is certified that error appears in the above—identified patent and that said Letters Patent is hereby corrected as shown below:

Claim 1, line 56, change "comparaing" to --comparing--

Claim 1, line 61, change "devive" to --device--

Signed and Sealed this

Twenth-eighth Day of September 1982

[SEAL]

Attest:

Attesting Officer

GERALD J. MOSSINGHOFF

Commissioner of Patents and Trademarks